United States Patent
Kobayashi

(10) Patent No.: US 7,958,964 B2
(45) Date of Patent: Jun. 14, 2011

(54) POWER STEERING SYSTEM FOR VEHICLE

(75) Inventor: Takeshi Kobayashi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 562 days.

(21) Appl. No.: 11/362,089

(22) Filed: Feb. 27, 2006

(65) Prior Publication Data
US 2006/0191734 A1    Aug. 31, 2006

(30) Foreign Application Priority Data
Feb. 28, 2005   (JP) ................ 2005-053079

(51) Int. Cl.
  *B62D 5/02*   (2006.01)
  *B62D 5/04*   (2006.01)
(52) U.S. Cl. .................. 180/444; 180/443
(58) Field of Classification Search ........ 180/443, 180/444; 280/775
See application file for complete search history.

(56) References Cited

U.S. PATENT DOCUMENTS

| | | | | |
|---|---|---|---|---|
| 4,396,083 A * | 8/1983 | Wehberg | 180/406 |
| 4,476,954 A * | 10/1984 | Johnson et al. | 180/333 |
| 5,021,721 A * | 6/1991 | Oshita et al. | 318/432 |
| 5,238,286 A * | 8/1993 | Tanaka et al. | 280/779 |
| 5,511,823 A * | 4/1996 | Yamaguchi et al. | 280/777 |
| 5,887,671 A * | 3/1999 | Yuki et al. | 180/68.1 |
| 7,198,296 B2* | 4/2007 | Sadakata et al. | 280/775 |
| 2002/0056982 A1* | 5/2002 | Brownlee et al. | 280/779 |
| 2003/0201134 A1* | 10/2003 | Ishii et al. | 180/307 |
| 2004/0163879 A1* | 8/2004 | Segawa | 180/444 |
| 2005/0035585 A1* | 2/2005 | Lee | 280/779 |
| 2005/0081675 A1* | 4/2005 | Oshita et al. | 74/493 |
| 2006/0065471 A1* | 3/2006 | Davis et al. | 180/444 |
| 2006/0191735 A1* | 8/2006 | Kobayashi | 180/443 |
| 2006/0191737 A1* | 8/2006 | Kobayashi | 180/444 |
| 2006/0201270 A1* | 9/2006 | Kobayashi | 74/388 PS |
| 2007/0137915 A1* | 6/2007 | Sanagi et al. | 180/232 |
| 2009/0200781 A1* | 8/2009 | Hatakenaka et al. | 280/748 |

FOREIGN PATENT DOCUMENTS

| | | | |
|---|---|---|---|
| GB | 2344084 A * | 5/2000 |
| JP | 09290716 A * | 11/1997 |
| JP | 10086829 A * | 4/1998 |
| JP | 11-171029 A | 6/1999 |
| JP | 2000-234971 A | 8/2000 |

(Continued)

*Primary Examiner* — Joanne Silbermann
*Assistant Examiner* — Daniel Yeagley
(74) *Attorney, Agent, or Firm* — Birch, Stewart, Kolasch & Birch, LLP

(57) ABSTRACT

A power steering system for a vehicle includes a steering shaft with its rear end in connection with a steering handle and with its axis inclined forwardly downwards. An electric motor is disposed with its axis orthogonal to a plane containing the axis of the steering shaft. The electric motor applies a steering force to the side of a steering wheel or wheels according to an operational torque exerted on the steering handle. This enables the power steering system to be easily applied to a vehicle in which the portion on the front side relative to the steering handle is short. A steering shaft is rotatably supported on a support case, at least a part of which is disposed on the inner side of the rotational locus of a steering handle in plan view. The rear end of an electric motor mounted to the support case is disposed on the front side relative to the rear end of the steering shaft.

12 Claims, 10 Drawing Sheets

FOREIGN PATENT DOCUMENTS

| JP | 2000-344111 A | 12/2000 |
| JP | 2003-034252 A | 2/2003 |
| JP | 2003-054432 A | 2/2003 |
| JP | 2003-341526 A | 12/2003 |

* cited by examiner

The present invention will become more fully understood from the detailed description given hereinbelow and the accompanying drawings which are given by way of illustration only, and thus are not limitative of the present invention, and wherein:

POWER STEERING SYSTEM FOR VEHICLE

CROSS-REFERENCE TO RELATED APPLICATIONS

This nonprovisional application claims priority under 35 U.S.C. §119(a) on Patent Application No. 2005-053079, filed in Japan on Feb. 28, 2005, the entirety of which is incorporated herein by reference.

BACKGROUND OF THE INVENTION

1. Field of the Invention

The present invention relates to a power steering system for a vehicle, including a steering shaft with its rear end in connection with a steering handle and with its axis inclined forwardly downwards, and an electric motor disposed with its axis orthogonal to a plane containing the axis of the steering shaft and imparting to the side of a steering wheel or wheels a steering force according to an operational torque exerted on the steering handle.

2. Description of Background Art

A vehicle in which such a power steering system as above-mentioned is provided in the vicinity of an operating pedal operated by the vehicle driver's foot has been known, for example as disclosed in Japanese Patent Laid-Open No. Hei 11-171029.

In the vehicle disclosed in Japanese Patent Laid-Open No. Hei 11-171029, a support case rotatably bearing the steering shaft thereon and supporting the electric motor is disposed at a position comparatively remote from the steering handle, so that a sufficient space for disposing the power steering system must be secured on the front side of the steering handle. In a vehicle in which the portion on the front side relative to the steering handle is comparatively short, for example an MUV (multi-utility vehicle), it is difficult to avoid interference of the power steering system with other component parts laid out on the front side of the steering handle. It is also difficult to dispose the power steering system on the front side of the steering handle.

SUMMARY OF THE INVENTION

The present invention has been made in consideration of the above-mentioned circumstances. Accordingly, it is an object of the present invention to provide a power steering system for a vehicle, which can be easily applied to a vehicle in which the portion on the front side of a steering handle is short.

In order to attain the above object, a first aspect of the present invention is directed to a power steering system for a vehicle, including a steering shaft with its rear end in connection with a steering handle and with its axis inclined forwardly downwards, and an electric motor disposed with its axis orthogonal to a plane containing the axis of the steering shaft and applying to the side of a steering wheel or wheels a steering force according to an operational torque exerted on the steering handle. The steering shaft is rotatably supported on a support case at least part of which is disposed on the inner side relative to the rotational locus of the steering handle in plan view. The rear end of the electric motor mounted to the support case is disposed on the front side relative to the rear end of the steering shaft.

According to a second aspect of the present invention, at least a part of the electric motor is disposed on the inner side relative to the rotational locus of the steering handle on a projection onto a plane orthogonal to the axis of the steering shaft.

According to a third aspect of the present invention, the rear end in a non-operative state of an operating pedal disposed on the lower side of the steering handle is disposed on the outer side relative to the rotational locus of the steering handle on the projection, and the lower end of the electric motor is disposed on the upper side relative to the operating pedal.

According to a fourth aspect of the present invention, in that the electric motor is so disposed that, on a projection onto a vertical plane containing the axis of the steering shaft, a straight line connecting the rear end in a non-operative state of the operating pedal and the rear end of the electric motor to each other intersects with the rotational locus of the steering handle.

According to the first aspect of the present invention, at least a part of the support case to which the electric motor is mounted is disposed on the inner side relative to the rotational locus of the steering handle in plan view, so that the electric motor is disposed at a position close to the steering handle. Therefore, it is possible to reduce the space which should be secured on the front side of the steering handle for disposing the power steering system, and to easily apply the power steering system even to a vehicle in which the portion on the front side relative to the steering handle is short, while easily obviating the interference of the power steering system with other component parts disposed on the front side of the steering handle.

According to the second aspect of the present invention, the electric motor can be disposed in a compact form on the front side of the vehicle driver, restrictions due to the layout of the electric motor can be reduced, and the space for the passengers can be secured sufficiently.

According to the third aspect of the present invention, the operating pedal located on the lower side of the steering handle and the electric motor is so disposed as not to overlap with the electric motor and the steering handle in a direction along the axis of the steering shaft, whereby the operating space for the operating pedal can be easily secured while enhancing the visual check property for checking the operating pedal by the vehicle driver.

According to the fourth aspect of the present invention, the electric motor can be laid out closer to the steering handle side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
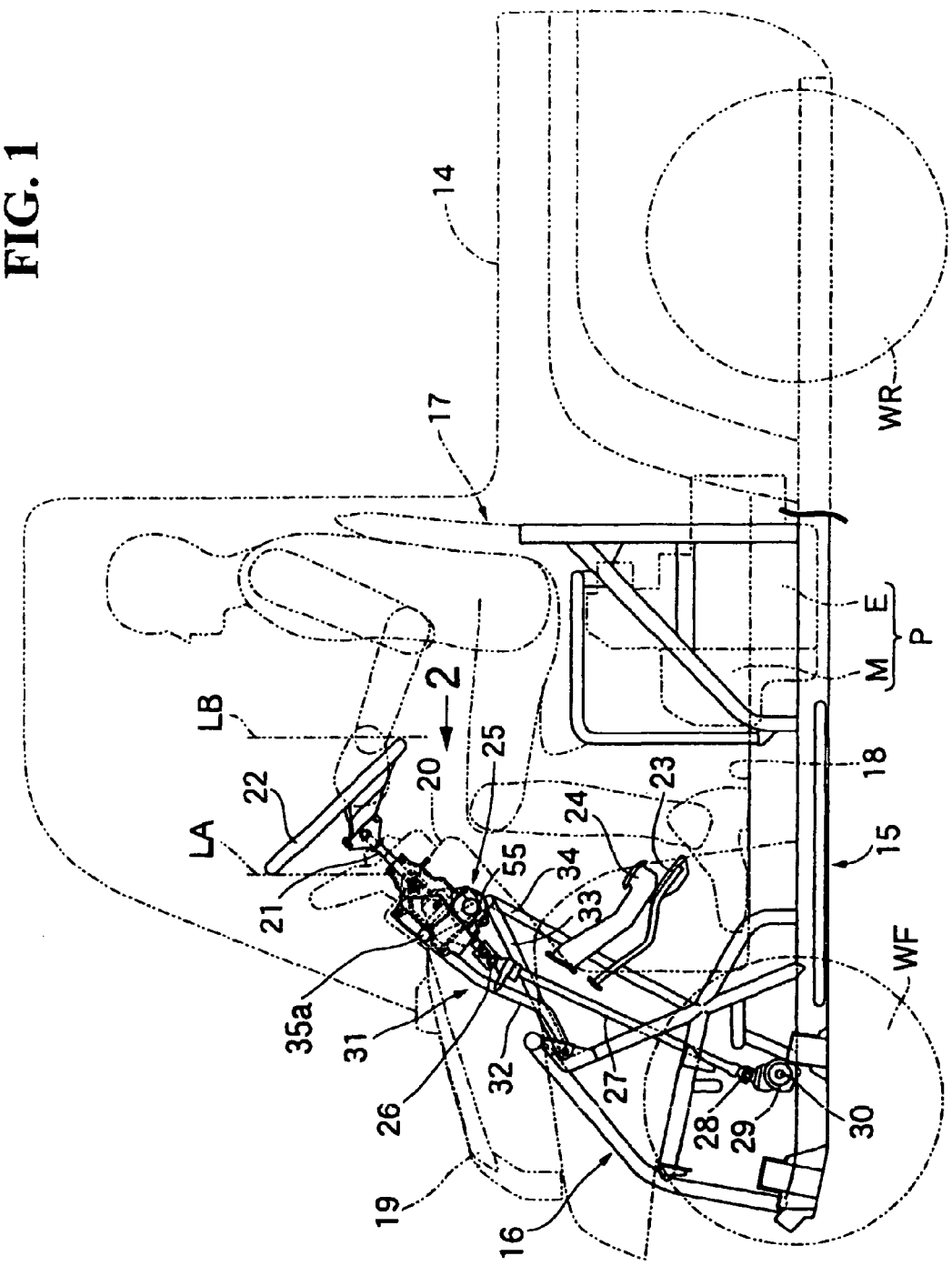
FIG. 1 is a side view of a vehicle to which the present invention has been applied.

The present invention will now be described with reference to the accompanying drawings, wherein the same or similar elements will be identified with the same reference numerals.

FIGS. 1 to 11 illustrate one embodiment of the present invention. First, in FIG. 1, the vehicle is a four-wheel, low-floor, small-type vehicle used as a carrying all-terrain vehicle such as a golf cart. Left and right front wheels WF are used as steering wheels and are suspended at front portions of a vehicle body 15. Left and right rear wheels WR are used as driving wheels and are suspended at rear portions of the vehicle body 15. The vehicle body 15 has a support frame 16 at its front end formed by combining a plurality of pipes. A dashboard 20 is disposed in continuation with a rear portion of a front cover 19 covering the support frame 16.

A low-floor type floor portion 18 on which the feet of the passengers seated on a passengers' seat 17 can be placed is provided on the vehicle body 15 between the passengers' seat 17 and the dashboard 20. The passengers' seat 17 is provided at an intermediate portion of the vehicle body 15 on the rear side of the dashboard 20. The rear end of a steering shaft 21 having an axis inclined forwardly downwards protrudes rearwards from the dashboard 20. A wheel-shaped steering handle 22 is mounted to the rear end of the steering shaft 21. The steering handle 22 is operated by the passenger on the passengers' seat 17 for steering. In addition, an accelerator pedal 23 and a brake pedal 24 project rearwards from lower portions of the dashboard 20 on the lower side of the steering handle 22.

A power unit P for driving the left and right rear wheels WR is composed of an engine E disposed on the rear side of the floor portion 18 and on the lower side of the passengers' seat 17, and a transmission M for transmitting the output of the engine E to the rear wheels WR through speed change. The power unit P is mounted on the vehicle body 15 at an intermediate portion between the front wheels WF and the rear wheels WR. In addition, a load-carrying platform 14 is provided at a rear portion of the vehicle body 15 on the rear side relative to the passengers' seat 17 so as to be disposed on the upper side of the rear wheels WR.

Figure 2:
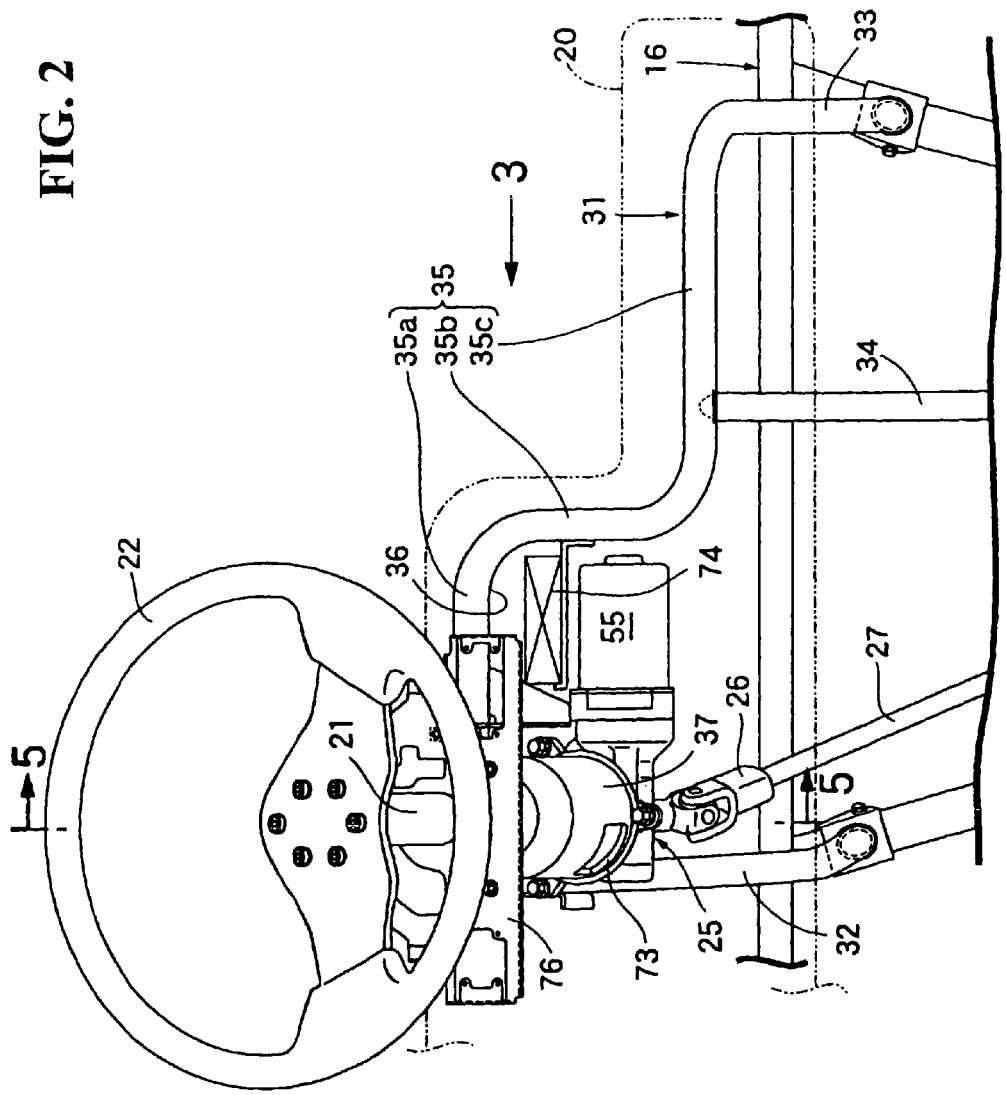
FIG. 2 is a view along arrow 2 of FIG. 1, in the condition where a dashboard is omitted.
Figure 3:
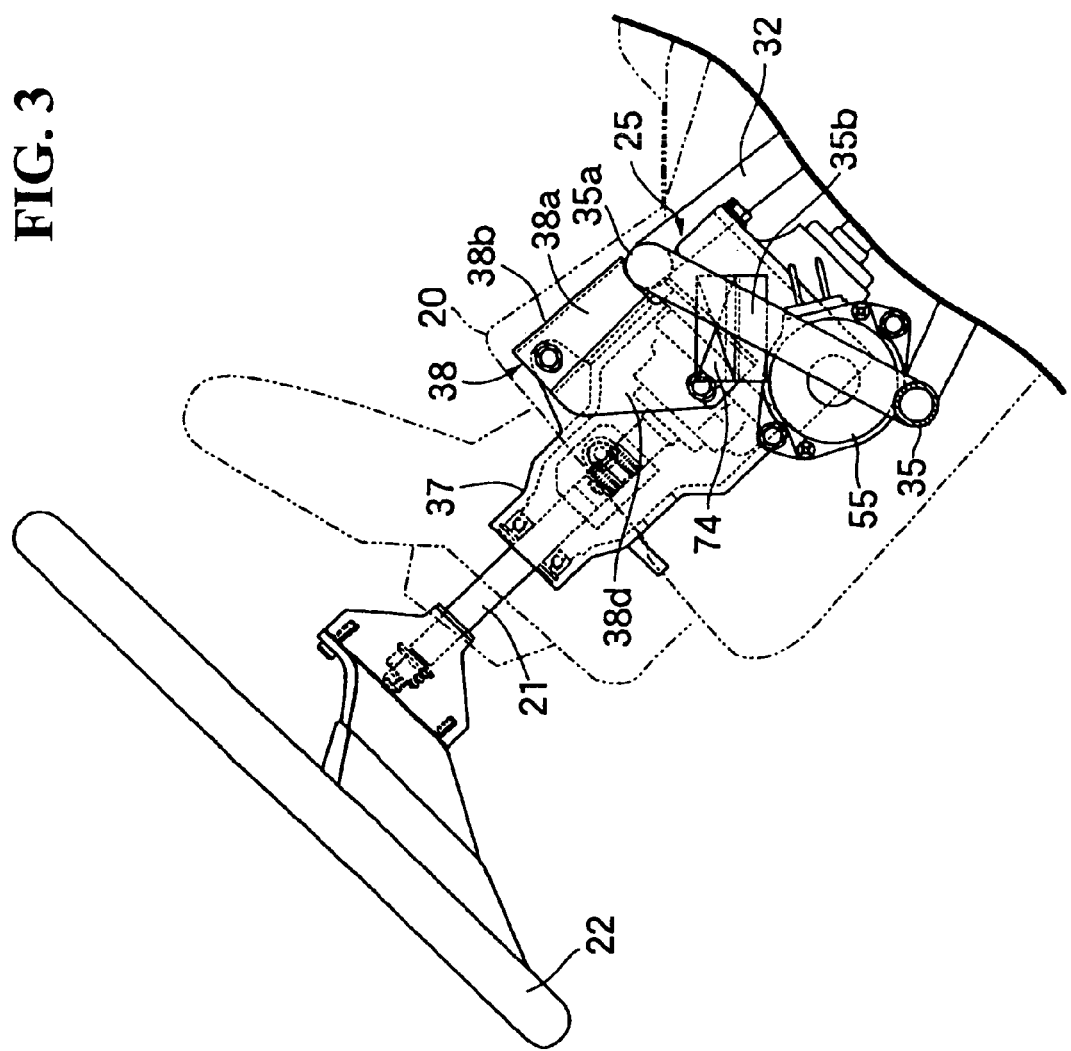
FIG. 3 is a view along arrow 3 of FIG. 2.

Referring also to FIGS. 2 and 3, an operating force exerted on the steering handle 22 is amplified by a power assist unit 25. The thus amplified operating force is transmitted from the power assist unit 25 to the rear end of a power transmission shaft 27 through a universal joint 26. In addition, a steering gear (not shown) connected to the front end of the power transmission shaft 27 through a universal joint 28 is contained in a steering gear box 29. A drag link 30 for steering the left and right front wheels WF is meshed with the steering gear in the steering gear box 29.

Figure 4:
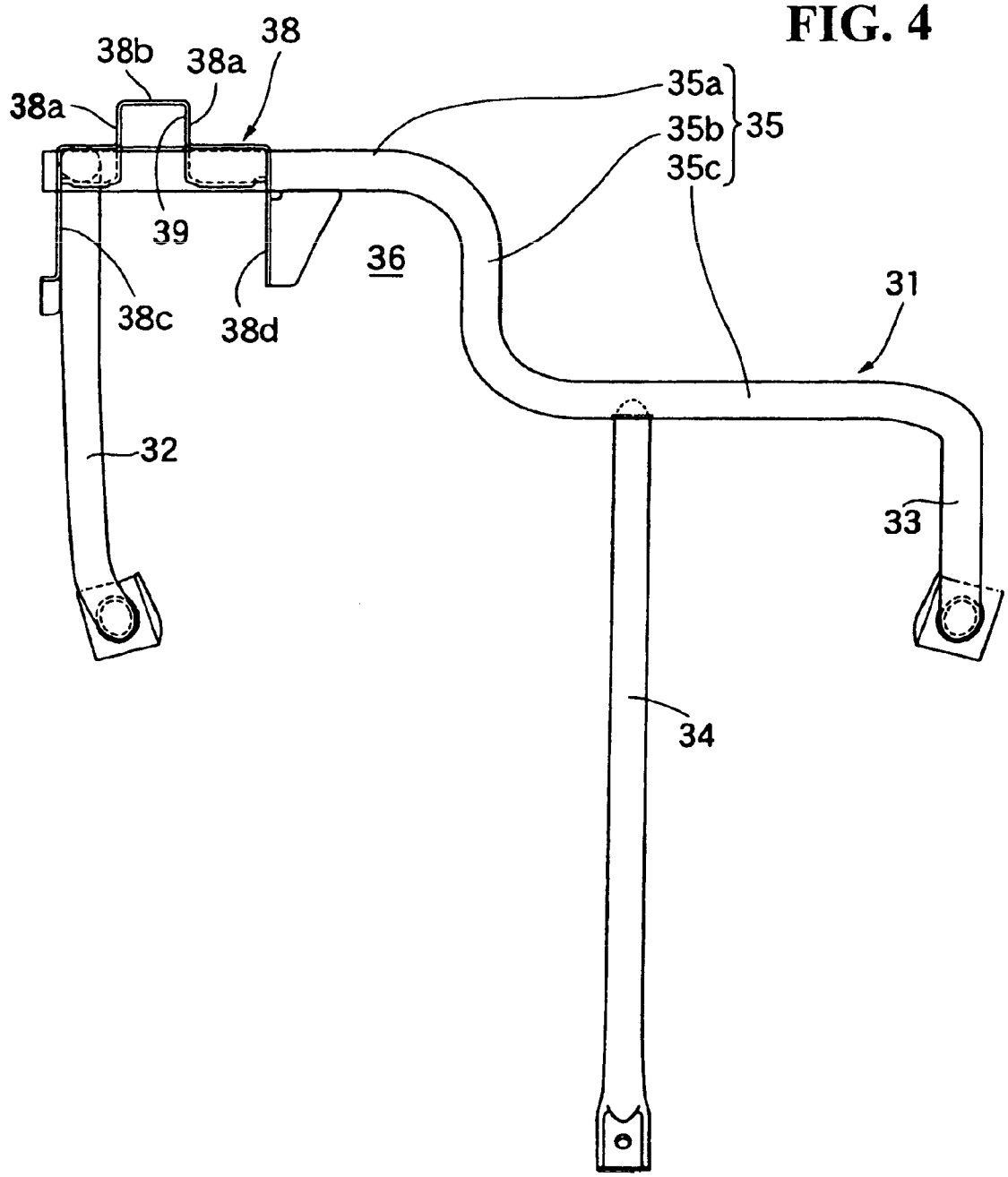
FIG. 4 is a view, as viewed in the same direction as FIG. 2, of a dashboard support stay.

Referring also to FIG. 4, a dashboard support stay 31 for supporting the dashboard 20 is attached to the support frame 16. The dashboard support stay 31, in the condition as viewed from a person directed toward the forward side with respect to the running direction of the vehicle, includes a left leg portion 32 attached at its lower end to the left side of the support frame 16 and extending rearwardly upwards. A right leg portion 33 is attached at its lower end to the right side of the support frame 16 and extends rearwardly upwards. An intermediate leg portion 34 is attached at its lower end to the support frame 16 at an intermediate portion between the left and right leg portions 32 and 33 and extends rearwardly upwards. A pipe-shaped cross member 35 connects the upper ends of the leg portions 32, 33 and 34 to each other.

The cross member 35 is disposed over roughly the entire width of the dashboard 20 so as to support the dashboard 20. The cross member 35 integrally has a front horizontal rod portion 35a disposed on the front side of the steering shaft 21 and extending in the width direction of the vehicle, a vertical rod portion 35b extending rearwardly downwards from an end portion of the front horizontal rod portion 35a along the front-rear direction of the vehicle on at least one of the left and right sides (the right side, in this embodiment) of the steering shaft 21, and a rear horizontal rod portion 35c extending from a rear end portion of the vertical rod portion 35b in the width direction of the vehicle.

Specifically, in the condition as viewed from a person directed toward the forward side with respect to the running direction of the vehicle, the cross member 35 is bent forwardly upwards on the left side. A recessed portion 36 that is recessed toward the front side in top plan view is formed by the front horizontal rod portion 35a and the vertical rod portion 35b so as to be opened on the left side in this embodiment. The steering shaft 21 is disposed in the recessed portion 36.

In addition, the left leg portion 32 and the intermediate leg portion 34 are composed of pipe members that are different from the cross member 35. The left leg portion 32 is attached to a left end portion of the front horizontal rod portion 35a of the cross member 35. The intermediate leg portion 34 is attached to an intermediate portion near a left end portion of the rear horizontal rod portion 35c of the cross member 35. The right leg portion 33 is formed integral with the cross member 35 so as to be bent forwardly downwards from a right end portion of the rear horizontal rod portion 35c.

The steering shaft 21 is rotatably borne by only a tubular support case 37 disposed in the recessed portion 36, and the support case 37 is fastened to a bracket 38 attached to the front horizontal rod portion 35a of the cross member 35 by welding or the like. Namely, the steering shaft 21 is supported on the bracket 38 through the support case 37. Moreover, at least a part of the support case 37 is disposed on the inner side relative to the rotational locus of the steering handle 22 (the outer circumference of the steering handle 22, in this embodiment) in plan view. In side view, as shown in FIG. 1, at least a part of the support case 37 (a rear portion of the support case 37, in this embodiment) is disposed between vertical planes LA and LB passing respectively through the front end and the rear end of the steering handle 22.

The bracket 38 integrally has a left-right pair of clamp plate portions 38a, 38a opposed to each other, a connection plate portion 38b connecting between the clamp plate portions 38a so as to form, together with both the clamp plate portions 38a, a roughly U-shaped mounting recessed portion 39 opened to the side of the steering shaft 21 in a plane orthogonal to the axis of the steering shaft 21. A left contact plate portion 38c is disposed along an outside surface of the left leg portion 32 at a position spaced to the left side from the mounting recessed portion 39. A right contact plate portion 38d is disposed at a position spaced to the right side from the mounting recessed portion 39 and opposed to the left contact plate portion 38c from the right side. The bracket 38 is attached to the front horizontal rod portion 35a and extends rearwardly upwards from the front horizontal rod portion 35a in a direction along the axis of the steering shaft 21.

Figure 5:
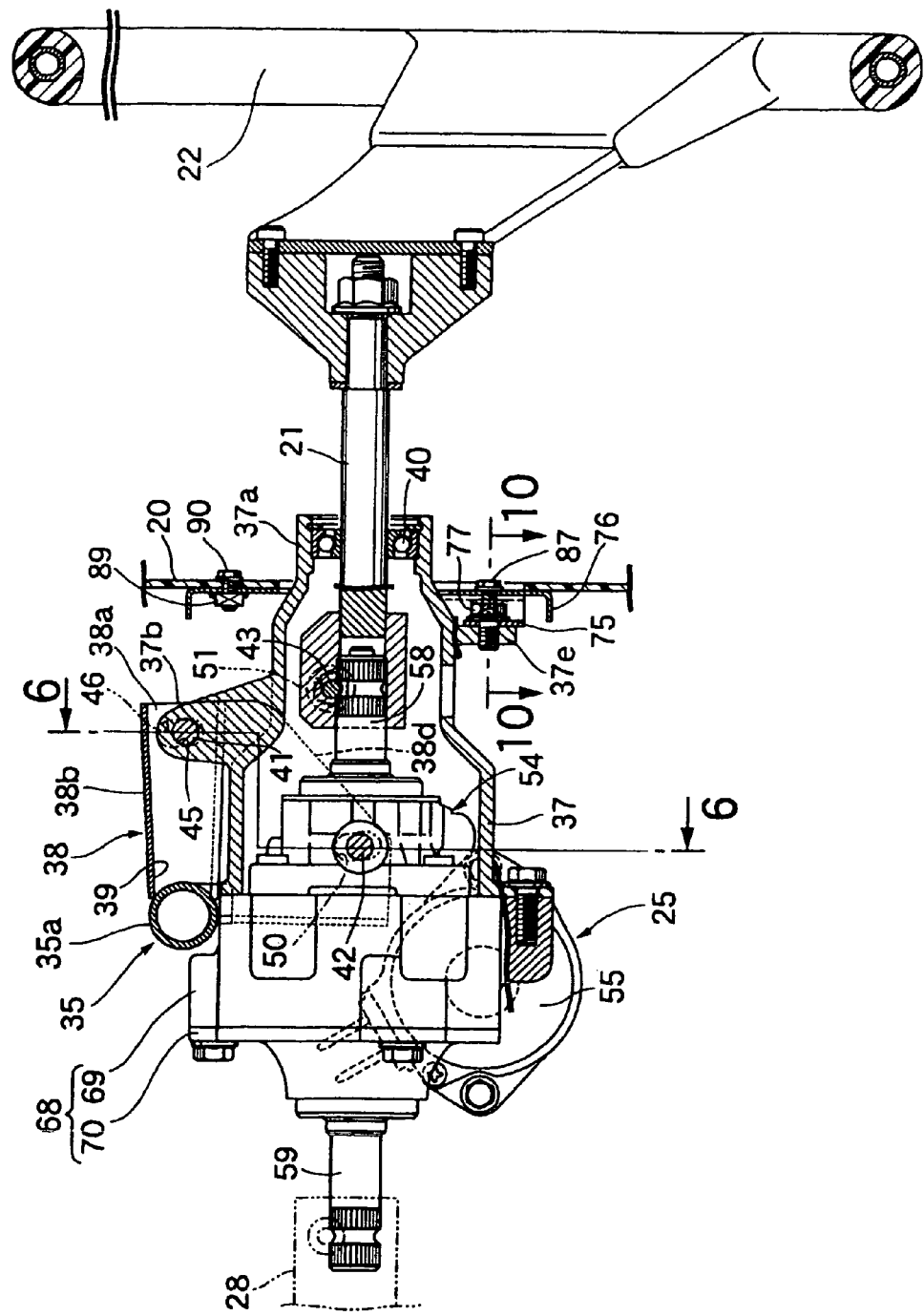
FIG. 5 is a sectional view along line 5-5 of FIG. 2.
Figure 6:
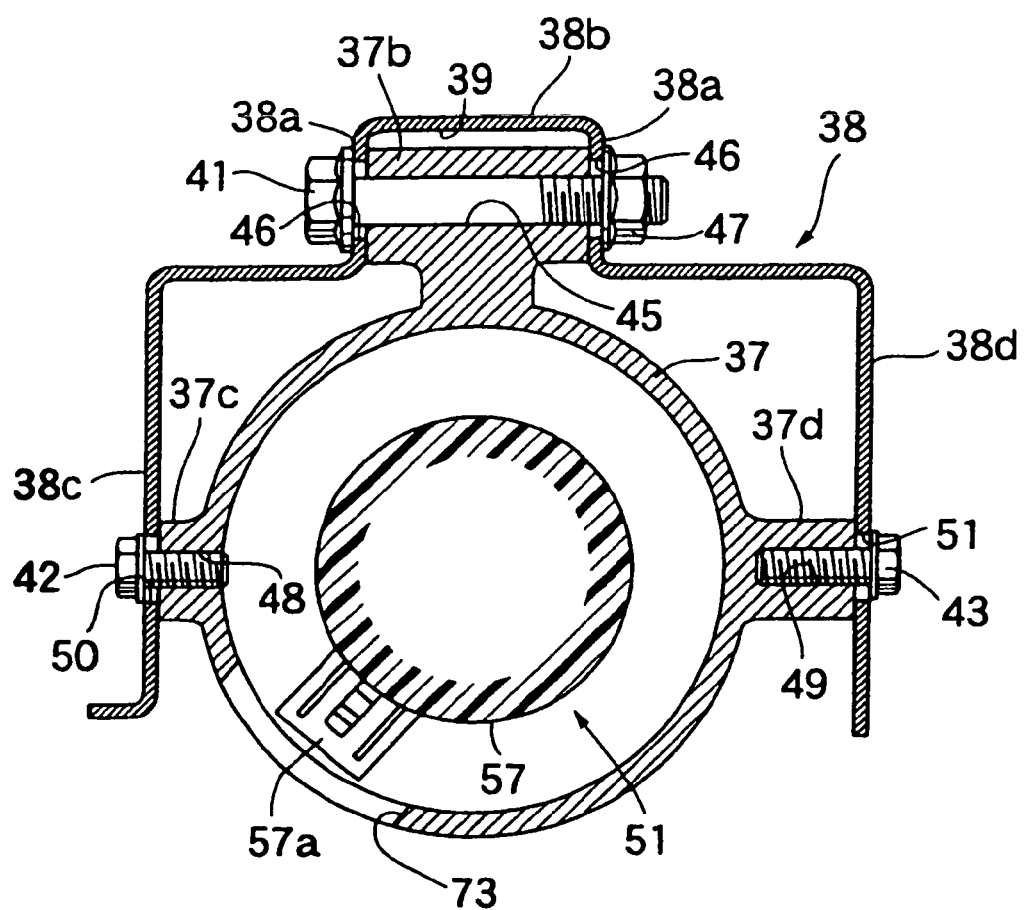
FIG. 6 is a sectional view along line 6-6 of FIG. 5.

Referring also to FIGS. 5 and 6, the support case 37 is formed in a stepped hollow cylindrical shape coaxial with the steering shaft 21 so as to be reduced stepwise in diameter along the direction toward the side of the steering handle 22, i.e., toward the rear side. Portions of the support stay 31 are omitted for clarity. A ball bearing 40 is interposed between the steering shaft 21 and a rear end portion 37a of the support case 37. The steering shaft 21 is coaxially inserted into the support case 37 via the rear end portion 37a of the support case 37. The rear end portion 37a of the support case 37 is the smallest diameter portion. With this construction, the steering shaft 21 is rotatably supported on the rear end portion 37a of the support case 37.

A front portion and both left and right side portions of the support case 37 are mounted to the front horizontal rod portion 35a of the cross member 35 through the bracket 38. Specifically, a front mounting projected portion 37b having a roughly T-shaped cross section is provided integrally on the outside surface of a front portion of the support case 37. A left mounting projected portion 37c and a right mounting projected portion 37d are provided integrally on the outside surfaces of left and right portions of the support case 37, respectively. As can be seen from FIG. 6, the front mounting projected portion 37b, the left mounting projected portion 37c and the right mounting projected portion 37d project from the cylindrical support case 37. The front mounting projected portion 37b is fitted in the mounting recessed portion 39 so that both of its ends make contact with both of the clamp plate portions 38a of the bracket 38. Tip end portions of the left mounting projected portion 37c and the right mounting projected portion 37d are put in contact with left and right contact plate portions 38c and 38d of the bracket 38, respectively.

The front mounting projected portion 37b is provided with a through-hole 45 through which passes a first bolt 41. Both of the clamp plate portions 38a of bracket 38 are provided respectively with first insertion holes 46 through which passes the first bolt 41. The front mounting projected portion 37b is fastened to both the clamp plate portions 38a of the bracket 38 by the first bolt 41 inserted through the pair of first insertion holes 46 and the through-hole 45 and a nut 47 screw engaged with the first bolt 41.

In addition, the left mounting projected portion 37c and the right mounting projected portion 37d of the support case 37 are provided respectively with screw holes 48 and 49. The left contact plate portion 38c is provided with a second insertion hole 50 through which a second bolt 42 is inserted to be screw engaged with the screw hole 48 in the left mounting projected portion 37c. The right contact plate portion 38d is provided with a third insertion hole 51 through which a third bolt 43 is inserted to be screw engaged with the screw hole 49 in the right mounting projected portion 37d. The second and third bolts 42 and 43 inserted respectively through the second and third insertion holes 50 and 51 are screw engaged with the screw holes 48 and 49 and tightened. Therefore, the left mounting projected portion 37c is fastened to the left contact plate portion 38c and the right mounting projected portion 37d is fastened to the right contact plate portion 38d.

One side of the through-hole 45 provided in the front mounting projected portion 37b and the first insertion holes 46 provided respectively in both the clamp plate portions 38a (the first insertion hole 46 in this embodiment) are formed in a slot-like shape. Furthermore, the second and third insertion holes 50 and 51 provided in the left contact plate portion 38c and the right contact plate portion 38d are formed in a slot-like shape.

Figure 7:
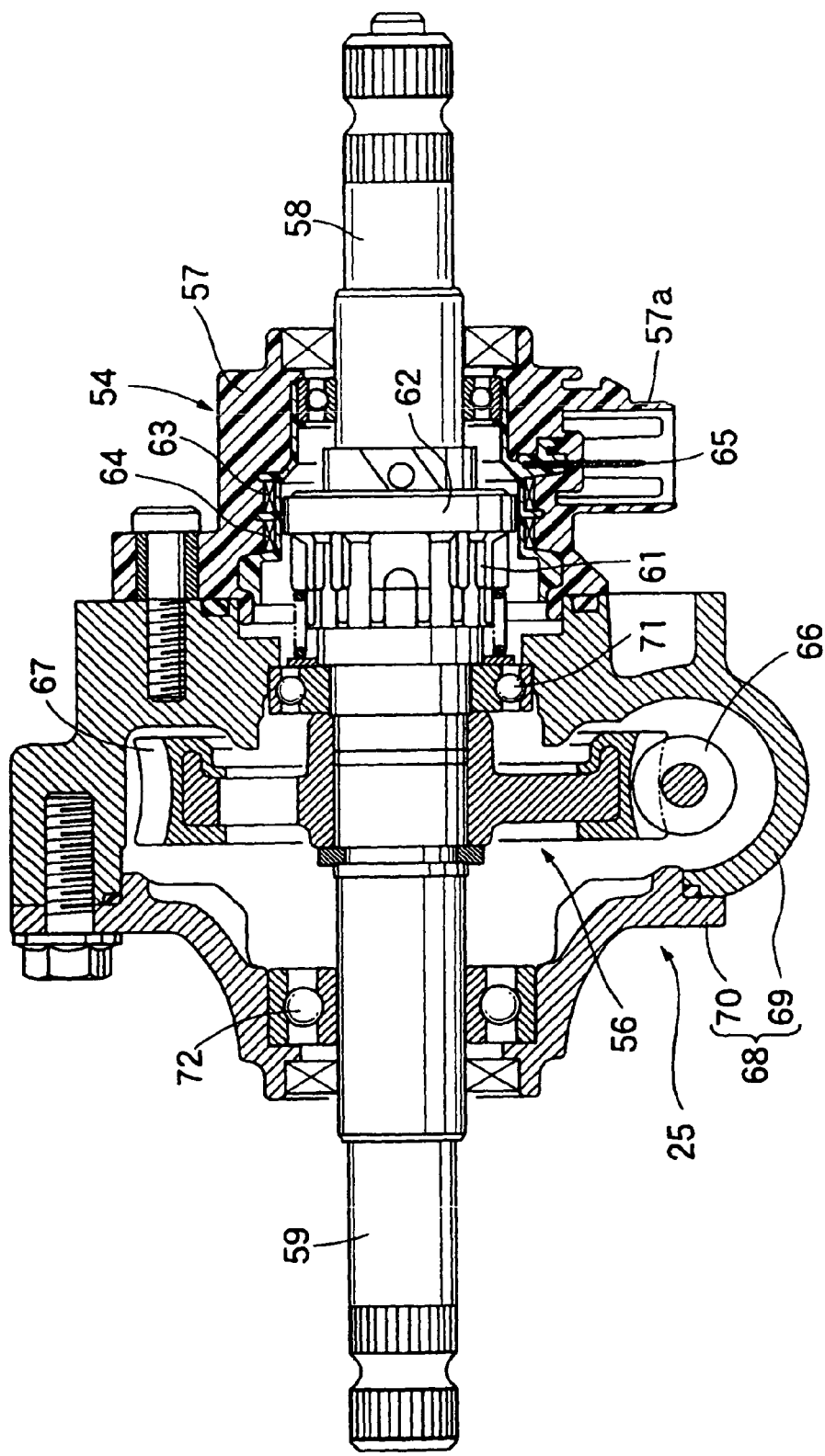
FIG. 7 is a vertically sectional side view of a power assist unit.

In FIG. 7, the power assist unit 25 has a unitized structure including a torque sensor 54 for detecting an operational torque exerted on the steering handle 22, an electric motor 55, and a power transmission mechanism 56 for transmitting the rotational power of the electric motor 55 to the power transmission shaft 27 for transmitting a steering force to the side of the front wheels WF. As clearly shown in FIG. 2, at least the electric motor 55 of the power assist unit 25 is disposed in the recessed portion 36 formed by the cross member 35.

The torque sensor 54 is a conventionally known one, and detailed description thereof is omitted. The torque sensor 54 includes a synthetic resin-made sensor housing 57. An input shaft 58 has one end portion relatively non-rotatably connected to the steering shaft 21 inside the sensor housing 57 and rotatably supported on the sensor housing 57. An output shaft 59 is disposed coaxially with the input shaft 58. A torsion bar (not shown) is incorporated in the input shaft 58 so as to connect the input shaft 58 and the output shaft 59 to each other. A movable member 61 is relatively non-rotatably connected to the output shaft 59 while permitting relative axial movement within a limited range and coaxially surrounding the other end portion of the input shaft 58 and one end portion of the output shaft 59. An annular core 62 is provided at the outer periphery of the movable member 61. A pair of coils 63 and 64 are aligned in the axial direction of the input shaft 58 and are embedded in the sensor housing 57 at a portion corresponding to the core 62.

When a relative angular displacement is generated between the input shaft 58 and the output shaft 59 due to a torsional deformation of the above-mentioned torsion bar according to the input of a torque to the input shaft 58, the position in the axial direction of the core 62 relative to both the coils 63 and 64 is changed. The relative positional change generates magnetic changes in the surroundings of both of the coils 63 and 64. Therefore, the inductances of the coils 63 and 64 are respectively changed. Due to the inductance changes, an operational torque inputted from the steering handle 22 through the steering shaft 21 is obtained. As a result of this, a coupler 57a with an output terminal 65 disposed therein for picking up a signal according to the operational torque integrally projects from the sensor housing 57.

The electric motor 55 has an axis orthogonal to a plane containing the axis of the steering shaft 21. The electric motor 55 is disposed on the rear side of the steering shaft 21, with its rotational axis substantially along the width direction of the vehicle. In addition, the power transmission mechanism 56 is composed of a worm gear 66 rotationally driven by the electric motor 55, and a worm wheel 67 fixed to the output shaft 59 so as to be meshed with the worm gear 66. The power transmission mechanism 56 is contained in a power transmission case 68 on which the output shaft 59 is rotatably supported.

The power transmission case 68 is composed of a case body 69 to which the sensor housing 57 of the torque sensor 54 is fastened, and a cover member 70 fastened to the case body 69. Ball bearings 71 and 72 are interposed respectively between the output shaft 59 and the case body 69 and between the output shaft 59 and the cover member 70. The other end portion of the output shaft 59 protruding from the cover member 70 is connected to the rear end of the power transmission shaft 27 through the universal joint 28. In addition, the electric motor 55 is mounted to the case body 69 of the power transmission case 68.

The power assist unit 25 is mounted to the support case 37 so that at least the torque sensor 54 is contained in the support case 37. In this embodiment, the case body 69 of the power transmission case 68 is fastened to the support case 37 so as to close a front opening end of the support case 37 while setting the torque sensor 54 to be contained in the support case 37.

Specifically, at least the electric motor 55, of the torque sensor 54, the electric motor 55 and the power transmission mechanism 56 which constitute the power assist unit 25, in this case, the power assist unit 25 as a whole is mounted to the front horizontal rod portion 35a of the cross member 35 through the support case 37 and the bracket 38. The electric motor 55 is supported on the bracket 38 through the support case 37.

An either left or right side portion or a rear portion of the support case 37 is provided with an opening portion 73 to which fronts the coupler portion 57a protruding from the sensor housing 57 of the torque sensor 54 so as to lead out a harness connected to the torque sensor 54. In this embodiment, the opening portion 73 is provided in a left side portion near a rear portion of the support case 37.

The electric motor 55 is controlled by a control unit 74 according to the value detected by the torque sensor 54. The control unit 74 is disposed in the vicinity of at least one of the cross member 35, the electric motor 55 and the steering shaft 21. In this embodiment, the control unit 74 is disposed in the cross member 35, the electric motor 55 and the steering shaft 21 by being surrounded by the cross member 35, the electric motor 55 and the steering shaft 21.

The control unit 74 is supported by the cross member 35, for example, the vertical rod portion 35b of the cross member 35 in such a manner that it is disposed on the rear and lower side of the front horizontal rod portion 35a of the cross member 35, on the front and upper side of the electric motor 55 of the power assist unit 25, and between the power assist unit 25 and the vertical rod portion 35b of the cross member 35.

Figure 8:
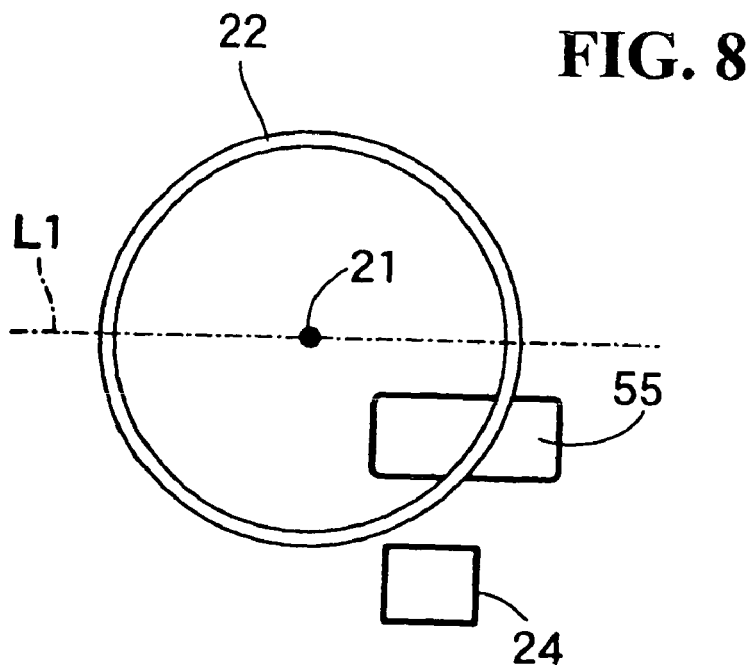
FIG. 8 is a conceptual diagram showing the relative layout of an electric motor, a steering handle and a brake pedal, on a projection onto a plane orthogonal to the axis of a steering shaft.

In addition, as shown in FIG. 8, the electric motor 55 is disposed at such a position that at least the upper end of the electric motor 55 is on the lower side relative to a horizontal line L1 orthogonal to the axis of the steering shaft 21, on a projection onto a plane orthogonal to the axis of the steering shaft 21, and at least a part of the electric motor 55 is disposed on the inner side relative to the rotational locus of the steering handle 22 (the outer circumference of the steering handle 22, in this embodiment) on the projection.

In addition, the rear end in the non-operative state of the brake pedal 24 which is an operating pedal disposed on the lower side of the steering handle 22 is disposed on the outer side relative to the rotational locus of the steering handle 22, on the above-mentioned projection, and the lower end of the electric motor 55 is disposed on the upper side relative to the brake pedal 24.

Figure 9:
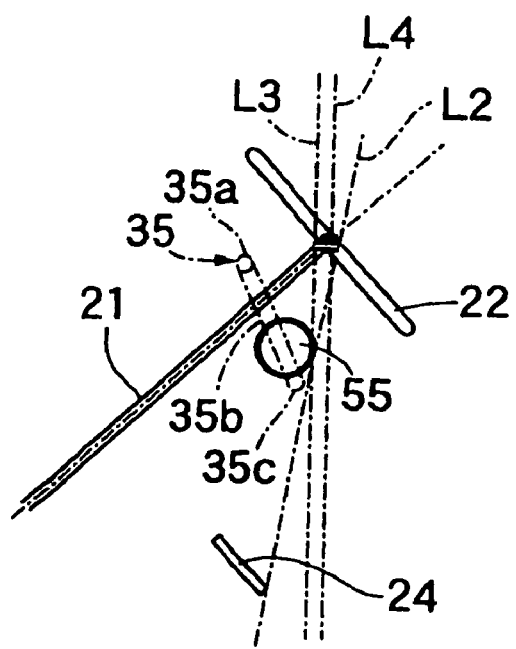
FIG. 9 is a conceptual diagram showing the relative positions of the steering handle, the steering shaft, the electric motor and the brake pedal, on a projection onto a vertical plane passing through the axis of the steering shaft.

In addition, as shown in FIG. 9, on a projection onto a vertical plane containing the axis of the steering shaft 21, the position of the electric motor 55 is so set that a straight line L2 connecting the rear end in the non-operative state of the brake pedal 24 and the rear end of the electric motor 55 intersects the rotational locus of the steering handle 22.

The rear end of the electric motor 55 is disposed on the front side relative to the rear end of the steering shaft 21, i.e., its connection portion for connection with the steering handle 22. In other words, the electric motor 55 is so disposed that, on a projection onto a vertical surface containing the axis of the steering shaft 21, the vertical line L3 passing through the rear end of the electric motor 55 is located on the front side relative to the vertical line L4 passing through the rear end of the steering shaft 21.

Figure 10:
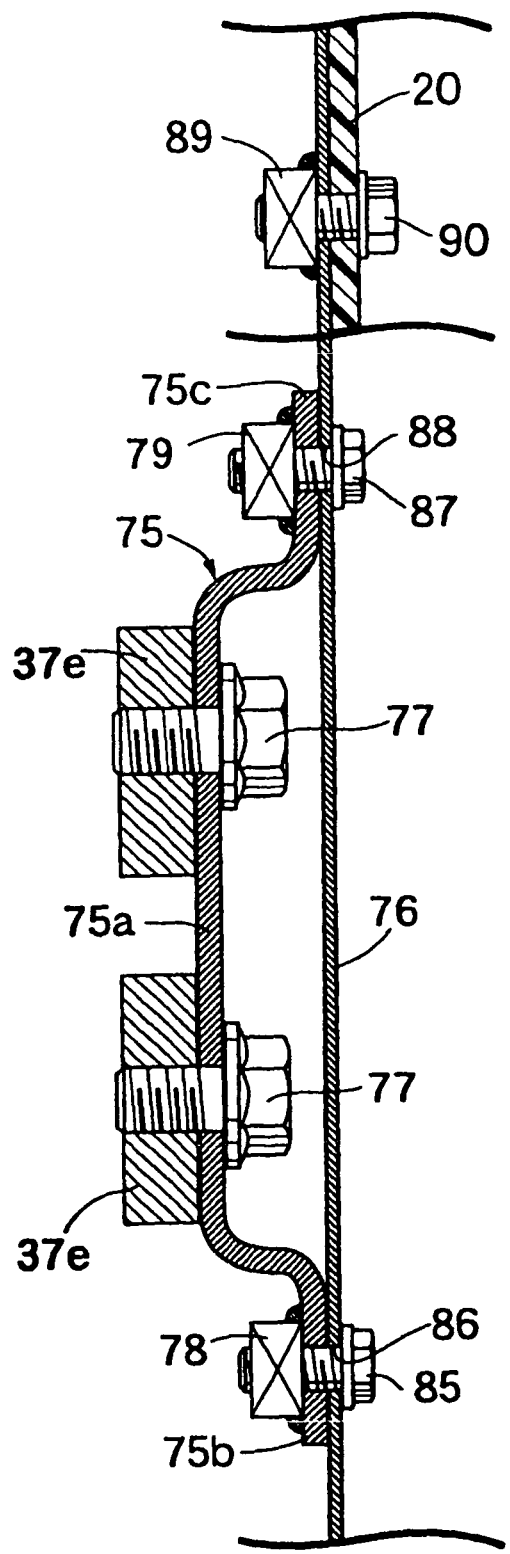
FIG. 10 is an enlarged sectional view along line 10-10 of FIG. 5.
Figure 11:
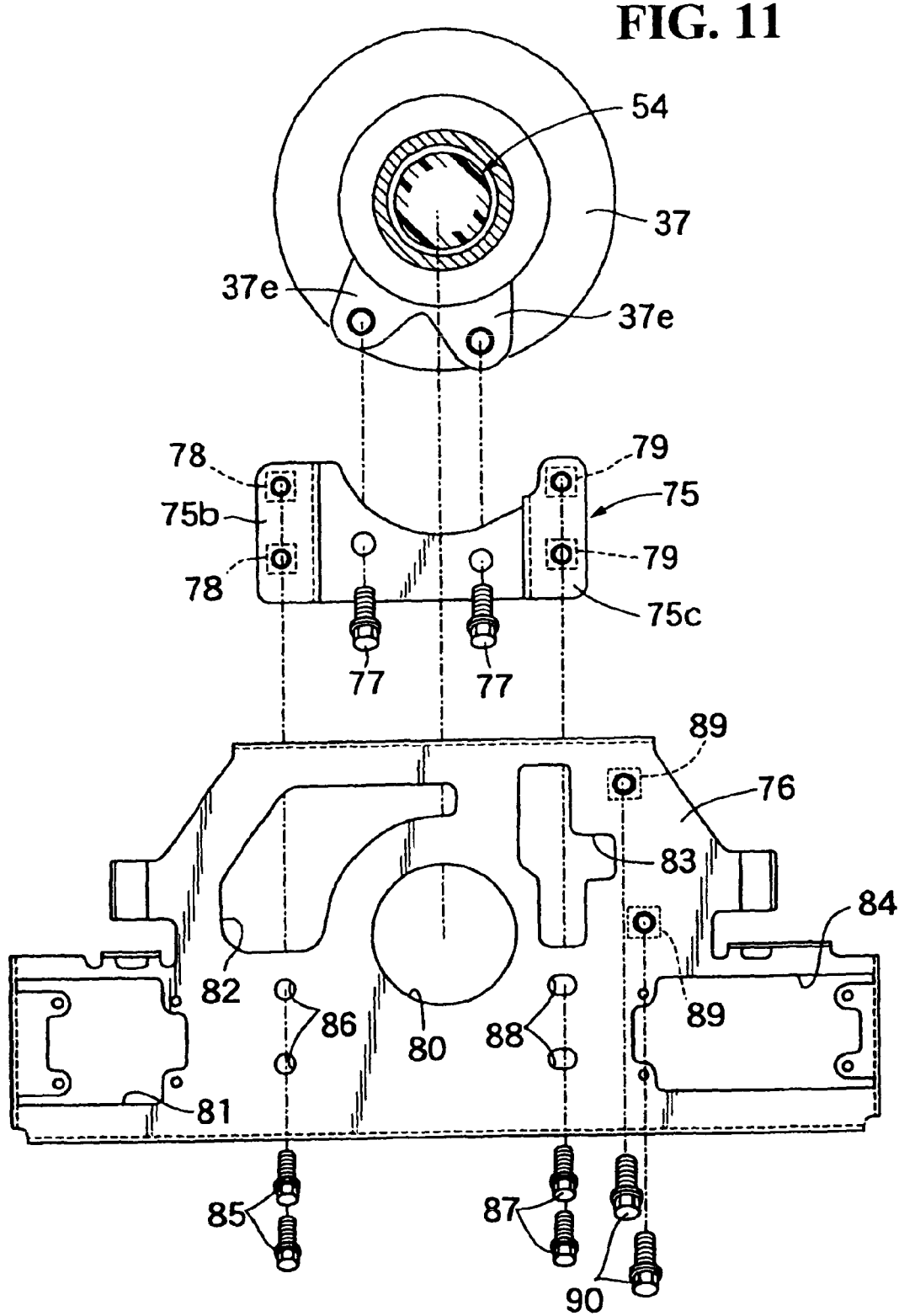
FIG. 11 is an exploded view of a support case, a support stay and a dashboard support plate.

In FIGS. 10 and 11, the dashboard 20 is fastened to a rear portion of the support case 37. In this embodiment, a dashboard support plate 76 for supporting the dashboard 20 is fastened to a support stay 75 mounted to a rear portion of the support case 37.

A pair of support projected portions 37e, 37e that project downwards are provided on a rear portion of the support case 37. The support stay 75 integrally includes a mount plate portion 75a to be fastened to the support projected portions 37e by a pair of bolts 77, 77. Left and right support plate portions 75b and 75c are contiguously provided on both left and right sides of the mount plate portion 75a so as to be located on the rear side of the mount plate portion 75a. Pairs of weld nuts 78, 78; 79, 79 are attached to the surfaces, on the side of the support case 37, of the left and right support plate portions 75b and 75c.

The dashboard support plate 76 is fastened to both of the support plate portions 75b and 75c of the support stay 75. The dashboard support plate 76 is provided with a circular through-hole 80 through which the support case 37 passes so as to project a rear portion of the support case 37 to the rear side. A plurality of through-holes 81, 82, 83 and 84 are provided for disposing instruments to be mounted to the dashboard 20. Moreover, the dashboard support plate 76 is provided with a pair of left insertion holes 86, 86 through which bolts 85, 85 are inserted to be screw engaged respectively with the weld nuts 78 of the left support plate portion 75b of the support stay 75. The dashboard support plate 76 is also provided with a pair of right insertion holes 88, 88 through which bolts 87, 87 are inserted to be screw engaged respectively with the weld nuts 79 of the right support plate portion 75c. Either of the left insertion holes 86 and both the right insertion holes 88 (in this embodiment, the right insertion holes 88) are formed in a slot-like shape, for absorbing dimensional errors and mounting errors of the dashboard support plate 76 relative to the support stay 75.

In addition, a pair of weld nuts 89, 89 are attached to the surface, on the side of the support case 37, of the dashboard support plate 76. A pair of bolts 90, 90 inserted through the dashboard 20 are screw engaged with the weld nuts 89.

With the dashboard 20 thus fastened to a rear portion of the support case 37, the control unit 74 and the cross member 35 are located on the inner side of the dashboard 20, and the electric motor 55 is also covered by the dashboard 20.

Now, functions of this embodiment will be described below. The steering shaft 21 is rotatably supported on only the single support case 37 mounted to the cross member 35 provided on the side of the vehicle body 15. At least the electric motor 55 of the power assist unit 25 (the power assist unit 25 as a whole, in this embodiment) is mounted to the cross member 35 through the support case 37. Therefore, the supporting of the steering shaft 21 and the mounting of the power assist unit 25 to the cross member 35 are performed by the single support case 37. Therefore, the steering shaft 21 and the power assist unit 25 are supported on the cross member 35 on the side of the vehicle body 15 by use of a compact configuration that is reduced in the number of component parts.

In addition, the front portion and both of the left and right side portions of the support case 37 are mounted to the cross member 35, so that the support case 37 can be firmly mounted to the cross member 35 side.

The support case 37 is integrally provided with the front mounting projected portion 37b that projects forwards, and the pair of left and right mounting projected portion 37c and 37d that project toward the left and right sides. The bracket 38 attached to the cross member 35 is provided with the pair of clamp plate portions 38a that are in contact with and fastened to the left and right ends of the front mounting projected portion 37b. The left and right contact plate portions 38c and 38d are in contact with and fastened to the tip ends of the left and right mounting projected portions 37c and 37d, respectively. Therefore, the support case 37 can be firmly fixed to the bracket 38 attached to the cross member 35.

In addition, either of the through-hole 45 provided in the front mounting projected portion 37b and the first insertion holes 46 provided respectively in both of the clamp plate portions 38a, 38a so as to insert the first bolt 41 therethrough (the first insertion holes 46, in this embodiment) are formed in a slot-like shape. The second and third insertion holes 50 and 51 provided respectively in the left and right contact plate portions 38c and 38d, that receive the second and third bolts 42 and 43 therethrough to be screw engaged respectively with the left and right mounting projected portions 37c and 37d, are formed in a slot-like shape. Therefore, the relative positions of the support case 37, on which the steering shaft 21 is rotatably supported, and the bracket 38 can be regulated, and the inclination of the axis of the steering shaft 21 can be easily regulated.

In addition, since the electric motor 55 is so disposed that its rotational axis extends substantially along the width direction of the vehicle, the generation of a part protruding to the passengers' side due to the layout of the electric motor 55 can be obviated, and the space for the passengers can be easily secured.

Furthermore, either a left or right side portion of the support case 37 or a rear portion of the support case 37 (in this embodiment, a left side portion near a rear portion of the support case 37) is provided with the opening portion 73 for leading out the harness connected to the torque sensor 54. Therefore, by preventing the harness connected to the torque sensor 54 from protruding toward the front side, simplification of the mounting structure of the support case 37 can be contrived, and a connection of the harness can be facilitated.

At least a part of the support case 37 (a rear portion of the support case 37 in this embodiment) is disposed on the inner side relative to the rotational locus of the steering handle 22 in plan view. The rear end of the electric motor 55 mounted to the support case 37 is disposed on the front side relative to the rear end of the steering shaft 22. Therefore, the electric motor 55 is disposed at a position close to the steering shaft 22. This makes it possible to reduce the space that is secured on the front side of the steering handle 22 for disposing the power steering system. This also makes it easy to apply the power steering system, even to a vehicle in which the portion on the front side relative to the steering handle 22 is short. Furthermore, this makes it easy to avoid the interference of the power steering system with other component parts laid out on the front side of the steering handle 22.

In addition, at least a part of the electric motor 55 is disposed on the inner side relative to the rotational locus of the steering handle 22 on the projection onto the plane orthogonal to the axis of the steering shaft 21. Therefore, the electric motor 55 can be laid out in a compact fashion on the front side of the vehicle driver, the restrictions due to the layout of the electric motor 55 can be reduced, and the space for the passengers can be thereby secured sufficiently.

In addition, the rear end in the non-operative state of the brake pedal 24 disposed on the lower side of the steering handle 22 is disposed on the outer side relative to the rotational locus of the steering handle 22 on the projection onto the plane orthogonal to the axis of the steering shaft 21 and the lower end of the electric motor 55 is disposed on the upper side of the brake pedal 24. Therefore, the brake pedal 24 located on the lower side relative to the steering handle 22 and the electric motor 55 can be so disposed as not to overlap with the electric motor 55 and the steering handle 22 in a direction along the axis of the steering shaft 21. Therefore, it is possible to easily secure an operating space for the brake pedal 24 while enhancing the visual checking of the brake pedal 24 by the vehicle driver.

Furthermore, the electric motor 55 is so laid out that the straight line L2 connecting the rear end in the non-operative state of the brake pedal 24 and the rear end of the electric motor 55 intersects with the rotational locus of the steering handle 22 on the projection onto the vertical plane containing the axis of the steering shaft 21. Therefore, the electric motor 55 can be disposed closer to the side of the steering handle 22.

In addition, the control unit 74 for controlling the operation of the electric motor 55 is laid out on the inner side of the dashboard 20. Therefore, the control unit 74 can be protected while reducing the number of the members for protecting the control unit 74.

In addition, the control unit 74 is disposed in the vicinity of at least one of the cross member 35, the electric motor 55 and the steering shaft 21 which are provided on the vehicle body 15 (all of the cross member 35, the electric motor 55 and the steering shaft 21, in this embodiment). Therefore, the capability to protect the control unit 74 can be enhanced by inhibiting external forces from acting on the control unit 74 as much as possible. The external forces are inhibited by at least one of the cross member 35, the electric motor 55 and the steering shaft 21, which are high in rigidity.

Furthermore, the cross member 35 has the front horizontal rod portion 35a extending in the vehicle width direction on the front side of the steering shaft 21 and the vertical rod portion 35b extending rearwardly downwards along the vehicle front-rear direction from an end portion of the front horizontal rod portion 35a. The cross member 35 is disposed on the inner side of the dashboard 20. The control unit 74 is disposed on the rear and lower side of the front horizontal rod portion 35a. This makes it possible to further enhance the capability to protect the control unit 74 by preventing external forces from acting on the control unit 74 from the front side.

In addition, the control unit 74 is disposed on the front and upper side of the electric motor 55, so that actions of external forces on the control unit 74 from the rear side are prevented by the electric motor 55, whereby the capability to protect the control unit 74 can be further enhanced. This, in cooperation with the configuration in which the front horizontal rod portion 35a is disposed on the front and upper side of the control unit 74, makes it possible to prevent external forces from acting on the control unit 74 from the front or rear side, and thereby to further enhance the capability to protect the control unit 74.

Moreover, the electric motor 55 is covered by the dashboard 20, and the electric motor 55 which is high in rigidity is disposed inside the dashboard 20. Therefore, the rigidity of the dashboard 20 can be enhanced, and the capability to protect the control unit 74 can be enhanced.

Furthermore, the power assist unit 25 is composed of a unitized combination of the torque sensor 54, the electric motor 55 and the power transmission mechanism 56. The power assist unit 25 is mounted to the support case 37 that is mounted to the front horizontal rod portion 35a of the cross member 35 while rotatably bearing the steering shaft 21 thereon. The control unit 74 is disposed between the power assist unit 25 and the vertical rod portion 35b of the cross member 35. Therefore, by disposing the control unit 74 between the vertical rod portion 35b on the vehicle body 15 side and the power assist unit 25, it is possible to prevent external forces from acting on the control unit 74 from the left or right side, and to enhance the capability to protect the control unit 74.

In addition, the cross member 35 provided in the vehicle body 15 is bent so as to form the recessed portion 36. At least the electric motor 55 (of the torque sensor 54, the electric motor 55 and the power transmission mechanism 56 which constitute the power assist unit 25) is disposed inside the recessed portion 36. Therefore, the electric motor 55 can be protected by the cross member 35. Specifically, the electric motor 55 can be protected by simply bending the cross member 35 which is a vehicle body component member, so that it is possible to simplify the vehicle body component members and to contrive a reduction in weight.

In addition, the steering shaft 21 and the electric motor 55 are supported by the bracket 38 which is attached to the cross member 35. Specifically, by supporting the steering shaft 21 as well as the electric motor 55 by the bracket 38 which is a vehicle body component member, it is possible to support and protect the electric motor 55 while simplifying the vehicle body component members.

Furthermore, with the electric motor 55 disposed on the inner side of the dashboard 20 covering the cross member 35, the electric motor 55 can be protected also by the dashboard 20.

While the embodiment of the present invention has been described above, the present invention is not limited to the above embodiment, and various design modifications are possible within the scope of the present invention.

For example, while the recessed portion formed in the cross member is shaped to open on the rear side and on the left side in the above-described embodiment, a recessed portion opened only on the rear side may be formed in the cross member.

In addition, the dashboard 20 may be provided with a ventilation hole at a position corresponding to the control unit 74 so that, for example, a running airflow or an airflow generated by a radiator-cooling fan impinges on the control unit 74.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power steering system for a vehicle, comprising:
   a steering shaft,
   said steering shaft having a rear end connected with a steering handle and an axis that is inclined forwardly downwards; and
   an electric motor,
   said electric motor being disposed with an axis orthogonal to a plane containing the axis of said steering shaft,
   said electric motor applying a steering force to a steering wheel or wheels according to an operational torque exerted on the steering handle,
   wherein said steering shaft is rotatably supported on a support case,
   a straight line extending vertically upward from a rear end in a non-operative state of an operating pedal disposed on a lower side of the steering handle, tangent to a rear of said electric motor and intersects with a rotational locus of the steering handle at the rear end of the steering shaft,
   wherein a vertical line tangent to the rear of said electric motor passes in front of the rear end of the steering shaft,
   wherein at least a part of said electric motor is disposed on an inner side of a constant projection of said rotational locus of the steering handle, wherein said rotational locus is the outer circumference of the steering handle and the projection of the rotational locus is coaxial with the steering axis so as to project onto a plane orthogonal to the axis of said steering shaft, and
   wherein the rear end in a non-operative state of the operating pedal disposed on the lower side of the steering handle is disposed on an outer side of the projection of the rotational locus of the steering handle, and
   a lower end of said electric motor is disposed above said operating pedal.

2. The power steering system for a vehicle according to claim 1, wherein said support case is formed in a stepped hollow cylindrical shape that is coaxial with said steering shaft, said support case decreasing in diameter in a direction toward the steering handle, and said steering shaft is rotatably supported by the support case by a bearing.

3. The power steering system for a vehicle according to claim 1, wherein said support case is mounted to a horizontal rod portion of a cross member that extends in a vehicle width direction on a front side of the steering shaft, and said horizontal rod portion is disposed on an inner side of a dashboard of the vehicle.

4. The power steering system for a vehicle according to claim 3, wherein said support case includes a front mounting projected portion formed integrally on an outside surface of a front portion of the support case, said front mounting projected portion having a generally T-shaped cross-section and being mounted to the horizontal rod portion within a recessed portion formed by the cross member.

5. The power steering system for a vehicle according to claim 4, wherein said support case includes a pair of left and right mounting projected portions integrally formed on the outside surface thereof, said left and right mounting projected portions being supported by a bracket attached to said cross member.

6. The power steering system for a vehicle according to claim 1, wherein at least a part of the support case being disposed on an inner side of a projection of a rotational locus of the steering handle along the axis of the steering shaft, and the rear end of said electric motor is disposed forwardly of the rear end of the steering shaft.

7. A vehicle, comprising:
   a vehicle body;
   front and rear wheels rotatably supported on the vehicle body, at least said front wheels being pivotable for steering the vehicle;
   a steering shaft, said steering shaft having a rear end connected with a steering handle and an axis that is inclined forwardly downwards; and
   an electric motor, said electric motor being disposed with an axis orthogonal to a plane containing the axis of said steering shaft,
   said electric motor applying a steering force to said front wheels according to an operational torque exerted on the steering handle, wherein said steering shaft is rotatably supported on a support case, a straight line extending vertically upward from a rear end in a non-operative state of an operating pedal disposed on a lower side of the steering handle, tangent to a rear of said electric motor and intersects with a rotational locus of the steering handle at the rear end of the steering shaft, wherein a vertical line tangent to the rear of said electric motor passes in front of the rear end of the steering shaft, wherein at least a part of said electric motor is disposed on an inner side of a constant projection of said rotational locus of the steering handle, wherein said rotational locus is the outer circumference of the steering handle and the projection of the rotational locus is coaxial with the steering axis so as to project onto a plane orthogonal to the axis of said steering shaft, and wherein the rear end in a non-operative state of the operating pedal disposed on the lower side of the steering handle is disposed on an outer side of the projection of the rotational locus of the steering handle, and a lower end of said electric motor is disposed above said operating pedal.

8. The vehicle according to claim 7, wherein said support case is formed in a stepped hollow cylindrical shape that is coaxial with said steering shaft, said support case decreasing in diameter in a direction toward the steering handle, and said steering shaft is rotatably supported by the support case by a bearing.

9. The vehicle according to claim 7, wherein said support case is mounted to a horizontal rod portion of a cross member that extends in a vehicle width direction on a front side of the steering shaft, and said horizontal rod portion is disposed on an inner side of a dashboard of the vehicle.

10. The vehicle according to claim 9, wherein said support case includes a front mounting projected portion formed integrally on an outside surface of a front portion of the support case, said front mounting projected portion having a generally T-shaped cross-section and being mounted to the horizontal rod portion within a recessed portion formed by the cross member.

11. The vehicle according to claim 10, wherein said support case includes a pair of left and right mounting projected portions integrally formed on the outside surface thereof, said left and right mounting projected portions being supported by a bracket attached to said cross member.

12. The vehicle according to claim 7, wherein at least a part of the support case being disposed on an inner side of a projection of a rotational locus of the steering handle along the axis of the steering shaft, and the rear end of said electric motor is disposed forwardly of the rear end of the steering shaft.

* * * * *